United States Patent [19]

Parkander

[11] Patent Number: 5,772,828
[45] Date of Patent: Jun. 30, 1998

[54] METHOD FOR MAKING A SIGN SUCH AS A REGISTRATION SIGN FOR VEHICLES

[75] Inventor: Göthe Anders Krister Parkander, Ljungby, Sweden

[73] Assignee: Stralfors AB, Ljungby, Sweden

[21] Appl. No.: 643,205

[22] Filed: May 2, 1996

Related U.S. Application Data

[62] Division of Ser. No. 201,010, Feb. 24, 1994, abandoned.

[30] Foreign Application Priority Data

Mar. 5, 1993 [SE]  Sweden .................................. 9300734

[51] Int. Cl.$^6$ ............................ B32B 31/10; B32B 31/18
[52] U.S. Cl. ......................... 156/245; 156/250; 156/256; 156/269; 156/277; 156/299; 156/302; 156/306.6
[58] Field of Search ......................... 264/279.1; 156/230, 156/240, 241, 242, 250, 256, 269, 277, 297, 299, 302, 306.6, 245

[56] References Cited

U.S. PATENT DOCUMENTS 4,626,185  12/1986  Monnet .................................. 425/110
4,935,324  6/1990  Grushkin et al. .......................... 430/98
5,085,918  2/1992  Rajan et al. ............................ 428/195

FOREIGN PATENT DOCUMENTS 440814  3/1991  European Pat. Off. ..

*Primary Examiner*—Curtis Mayes
*Attorney, Agent, or Firm*—McCormick, Paulding & Huber

[57] ABSTRACT

In a simple and low cost method for making a sign, such as a vehicle registration sign, indicia are formed by toner material applied by an electronically controllable printer to a portion of a film web or to one of a row of separate film portions, the surface of which web portion is preferably one reflecting light from vehicle headlamps. The printer is an ionographic one wherein the toner material is fixed on the surface of the web portion with pressure and in a cold state. The printed web portion is then combined with other parts including a transparent front plate adhesively bonded to the web portion and an injection moulded plastic frame to protect the web portion from mechanical damage and to seal it against injury from dirt and moisture.

17 Claims, 5 Drawing Sheets

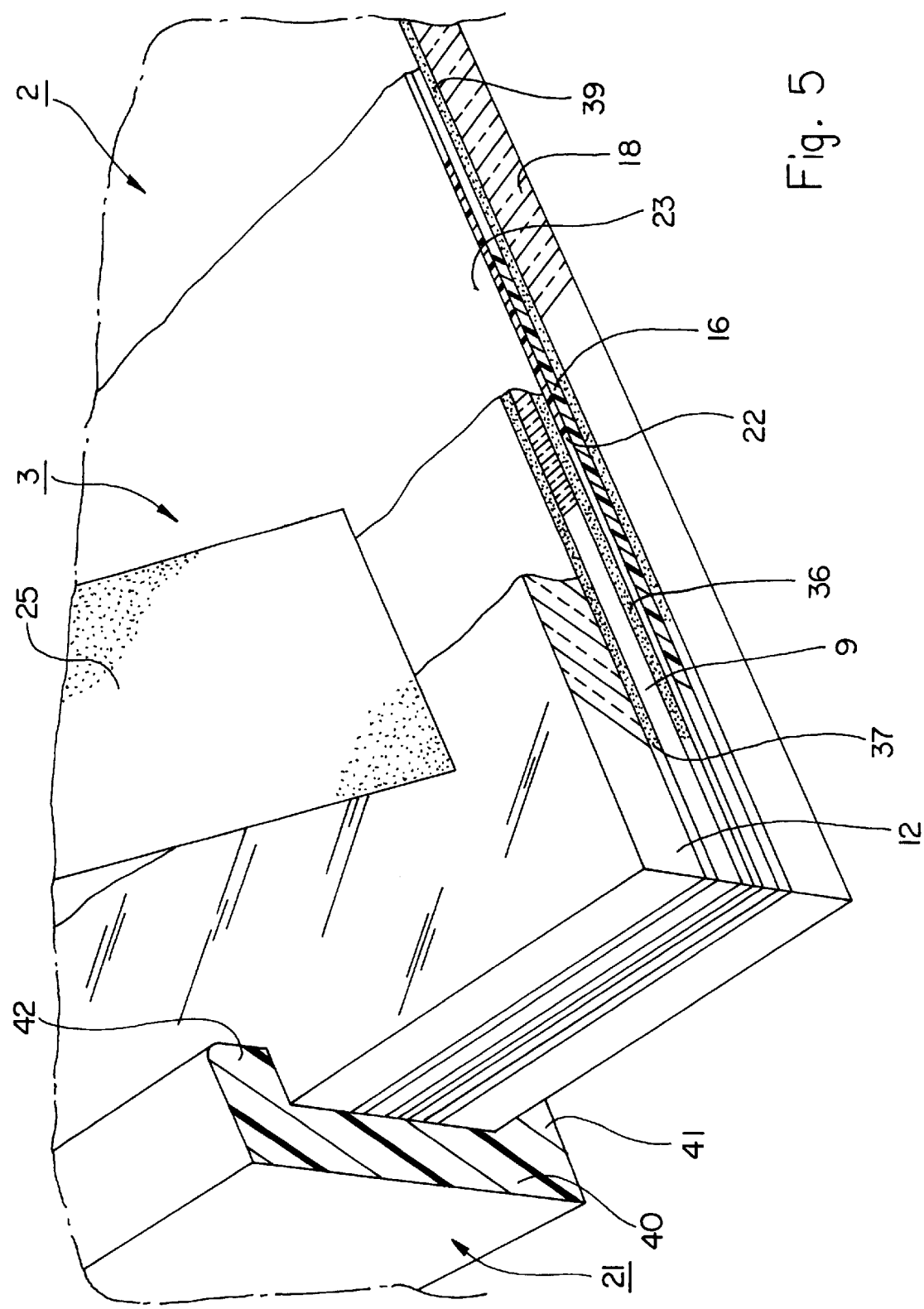

5,772,828

METHOD FOR MAKING A SIGN SUCH AS A REGISTRATION SIGN FOR VEHICLES

This is a divisional of application Ser. No. 08/201,010 filed on Feb. 24, 1994, now abandoned.

FIELD OF THE INVENTION

The present invention relates to method for making a sign, preferably a registration sign for vehicles, which sign includes a member consisting of a portion of a film web or of a row of separate film portions, whereby said member or portion is provided with information. preferably registration symbols or characters for vehicles, by way of toner material applied thereon by electronically variable application in an electronic printer.

BACKGROUND OF THE INVENTION

From EP. At, 457 544 it is already known to provide registration information on registration signs for vehicles by means of electronic printers and according to a predetermined program. Hereby, the electronic printers transfer a toner material to a travelling web of material in accordance with said program, whereafter the toner material is fixed on said web by means of a fusing method, or transferred to another web of material and fixed thereon by a fusing method.

Registration signs made in this way are expensive because extensive and expensive machines are required for the manufacture thereof and/or because the waste is considerable if the toner material is transferred from one web to another.

Similar methods for manufacturing registration signs for vehicles are described in GB, A, 2 126 389 and these manufacturing methods also require an extensive and expensive equipment, whereby the signs produced become expensive.

SUMMARY OF THE INVENTION

The object of the present invention is therefore to produce signs of the above type at a lower price than what is possible by means of the prior art methods.

The invention also relates to a simple method for manufacturing the signs defined above. These objects are solved in accordance with the invention in that indicia forming toner material is fixed on a preferably light-reflecting surface provided by a film portion of the sign by means of an ionographic printer with pressure by a cold pressure and fixing method, so that the sign can be manufactured using less complex equipment than previously while among other things it is no longer necessary to coordinate the rotary motion of a transfer drum for transferring the toner material with the speed of the web of material onto which said toner material shall be transferred. Then, the film portion after having received the printed toner material is adhesively bonded to a damage resistant transparent front plate and also, if wanted, to a bottom plate, and the package so formed is thereafter subjected to an injection moulding procedure whereby a plastic injection moulded frame is applied around the periphery of the package to seal the package against the entry of dirt and moisture.

BRIEF DESCRIPTION OF THE DRAWINGS

The invention will be further described below with reference to the accompanying figures wherein FIG. 1 schematically illustrates a plant for manufacturing signs in accordance with the method of the invention;

FIG. 5 with a perspective view illustrates a corner portion of the sign of FIG. 4, whereby various parts forming the sign are shown partially in section.

DETAILED DESCRIPTION OF THE PREFERRED EMBODIMENT

Figure 1:
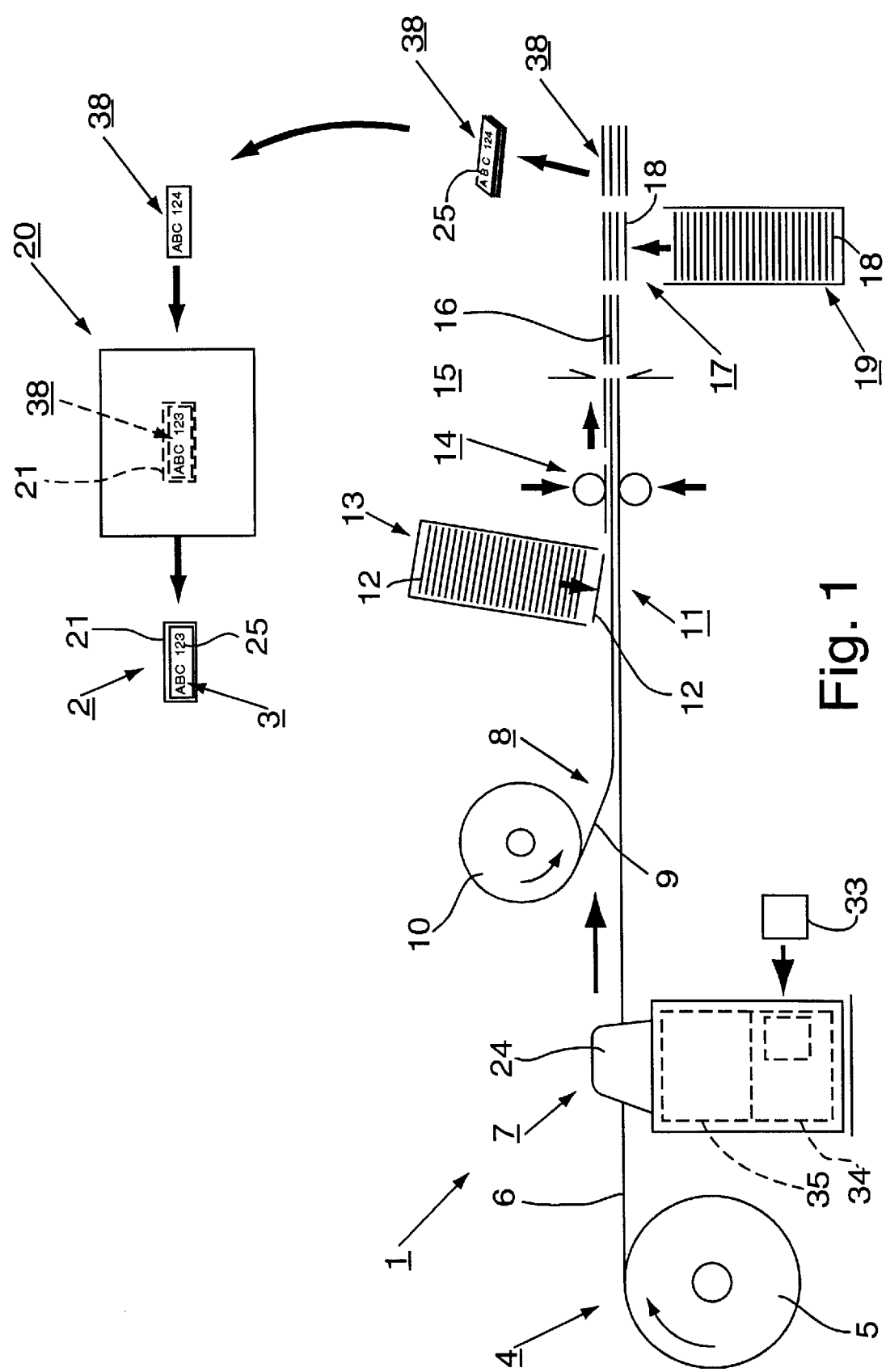

The plant 1 illustrated in FIG. 1 is adapted for continuous production of registration signs 2 for vehicles with different registration numbers 3, e.g. in consecutive order ABC 123, ABC 124, ABC 125, ABC 126 . . . ABC 130 and so on. The plant 1 comprises a station 4 with a film roll 5 from which a web 6 is unrolled (instead of a roll, station 4 may alternatively include a sheet magazine). This film web 6 is run through a registration-number printing station 7 to a station 8 wherein a plastic-film web 9 with adhesive properties on both sides is brought to the film web 6 from a roll 10 of plastic film. The film webs 6, 9 are run through a station II wherein front plates 12 are transferred to said webs 6, 9 from a front plate magazine 13. The webs 6, 9 with front plates 12 fixed thereon are moved through a compressing station 14 and thereafter through a cutting station 15 wherein the webs are cut in portions 16 such that each portion is provided with a complete registration number. These portions 16 with front plates 12 are fed through a station 17 wherein bottom plates 18 are transferred to said portions 16 from a magazine 19 and said portions 16 including front plates 16 and bottom plates 18 are finally run through an injection moulding machine 20 wherein a frame 21 is injection moulded around each portion 16 and its front plate 12 and bottom plate 18, whereafter the registration signs 2 are finished.

The film web 6 running through the station 7 for printing the registration numbers is on the top side provided with a layer 22 of material that forms a light-reflecting surface 23. This surface 23 is intended to reflect headlamp light from vehicles.

Figure 3:
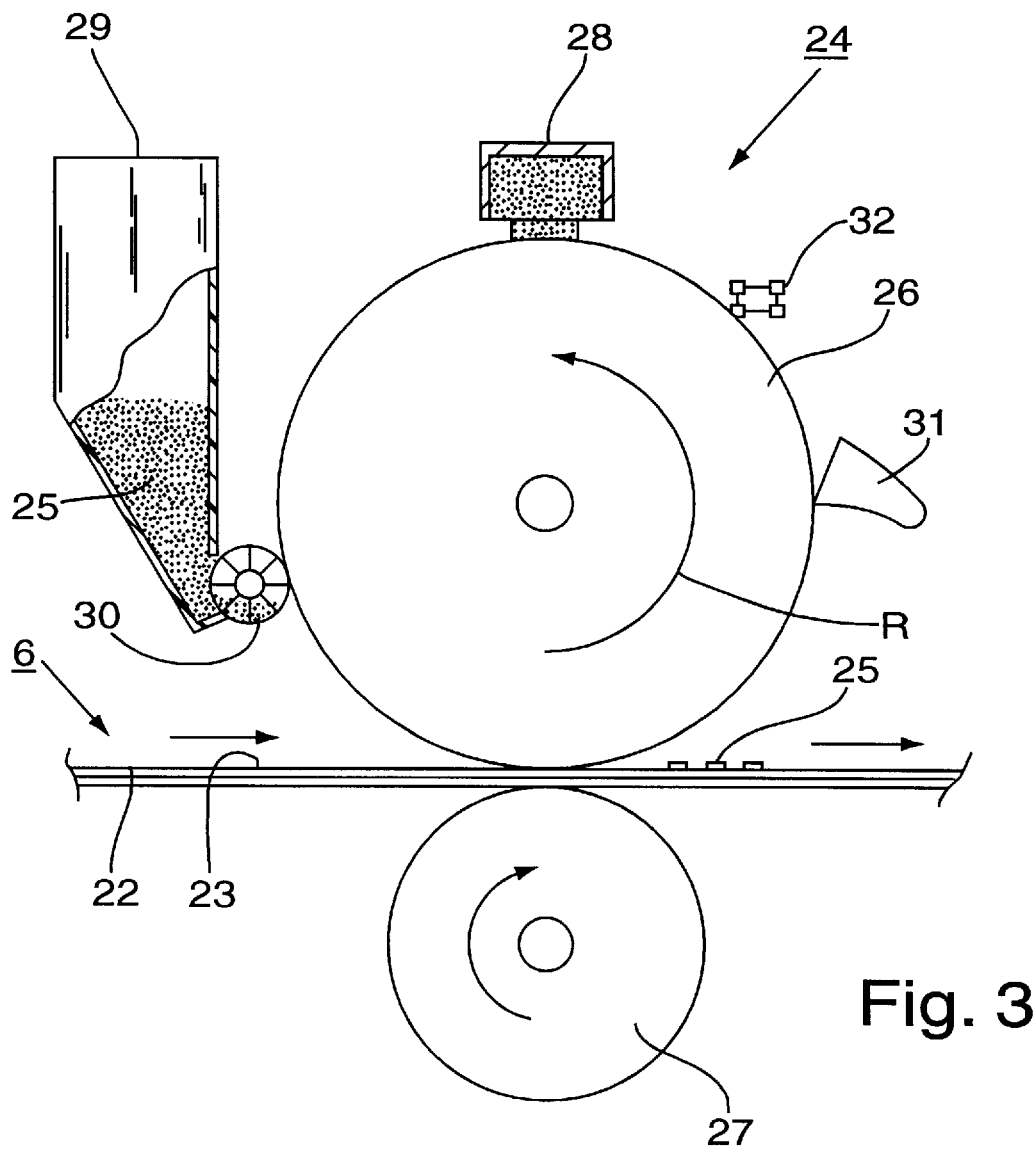
FIG. 3 with a side view schematically illustrates an ionographic printer forming part of the plant of FIG. 1.
Figure 4:
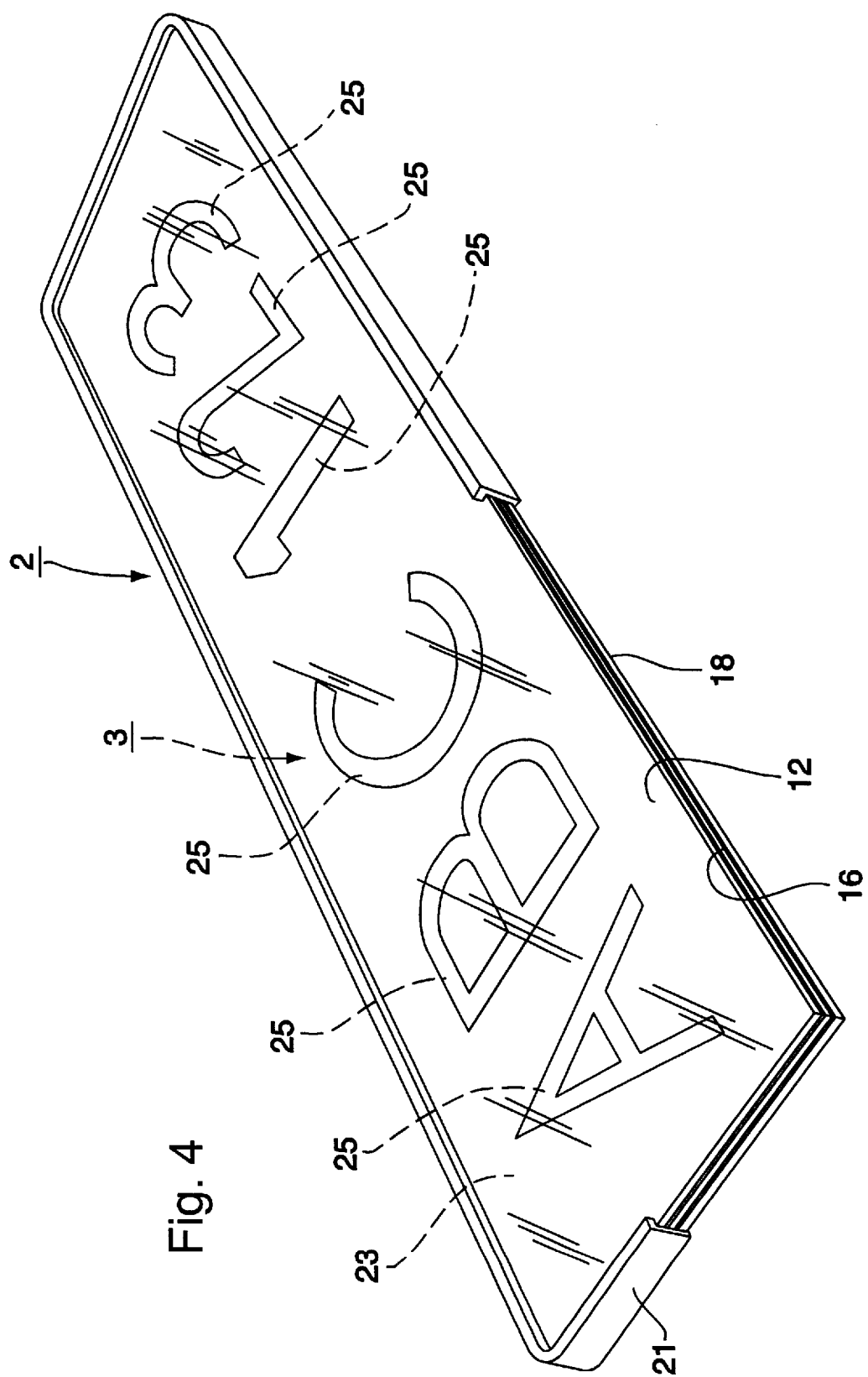
FIG. 4 is a perspective view of a sign according to the invention manufactured in the plant of FIG. 1, whereby the frame of the sign is partially cut away.

Printing of registration numbers is carried out continuously on the light-reflective surface 23 of the film web 6 by means of an ionographic printer 24 which applies toner material 25 onto said surface 23 and fixes it thereon with pressure while the film web 6 runs through the printer 24 at full speed. Ionographic printers 24 with such a picture transmitting function to travelling webs are already known and therefore the printer 24 is only schematically shown in FIG. 3. As is apparent from this figure, such an ionographic printer 24 includes a drum 26 for transferring toner material 25 in accordance with a predetermined picture to the film web 6 from above, a counter pressure roll 27 located under the web 6 just opposite to the drum 26, a so called ion cassette 28 situated close to the peripheral surface of the drum 26 and a magazine 29 for particulate toner material 25. The magazine 29 is located, seen in the direction of rotation R of the drum 26, after the ion cassette 28 and its toner material 25 is intended to be transferred to the drum 26 by a brush 30. The ionographic printer 24 further includes, in the direction of rotation R of the drum 26 after the point of contact of said drum 26 with the web 6, a scraper 31 for removing toner material remaining on the drum 26 as well as an erasing unit 32.

The ionographic printer 24 principally operates such that a supply of positive and negative ions are generated in a chamber. The positive ions are attracted by a negatively charged ion generator while some of the negative ions are gathered to a beam which is attracted by the drum 26, said drum being grounded and having a dielectric surface. Then the ion beam is not used, it is held back by a strong negative field. In order for the ion beam to accelerate towards the surface of the drum 26 during build-up of the latent picture or image. the "finger"-conduits are charged with a high negative charge in relation to the shielding field.

During build-up of the latent picture—here a registration number-ionization occurs by means of what is called "drive"-conduits or "finger"-conduits.

In order to e.g. obtain a resolution of 240 points/inch, 2048 drive units are required. However, the number can be reduced in a simple manner. An inclined matrix is defined by 16 "drive"-conduits and 128 "finger"-conduits, which requires only 144 drive units.

The function is that when an area to be charged is passing under an ion beam, the "drive"-conduit as well as the "finger"-conduit for that ion beam is activated. In practice, each "drive"-conduit is activated in turn while simultaneously the "finger"-conduits for the ion beams to be used are activated.

When the latent picture or image—here a registration number—on the drum 26 is brought in contact with the toner material 25 applied by the brush 30, a circuit is defined since the toner material is conductive. Negative charge disappear from the toner material 25 through the circuit and the remaining positive charge generates attraction forces between the toner material and the negatively charged latent picture—here a registration number—on the surface of the drum 26.

The toner material 25 is thereafter transferred to the surface 23 of the web 6 and fixed by means of pressure which can be generated by the counter pressure roll 27 as a holder-on for the web 6.

The process is a cold pressure and fixing method, in English "transfixing" since transfer and fixing of the toner material 25 occur in the same process.

Since a certain charge and some toner material 25 remain on the surface of the drum 26, two processes are needed for preparing the dielectric surface.

A scraper 31 (knife) of softer material than the dielectric drum scrapes off old toner material 25 from the surface. This toner material is thereafter received in a collecting rail.

An erasing unit 32 which shall reset the surface of the drum 26 to earth or ground level, consists of a thread of resistance material which is located behind a screen of conductive material. The screen is held at a variable voltage potential while an PF-signal is applied on the thread. This creates a lot of free ions which makes the surface uncharged.

The ionographic printer 24 is controlled to print registration numbers 3 on the light-reflective surface 23 of the web in accordance with a predetermined program. This program can be recorded by a customer on a diskette 33 (or transmitted through a modem or another data carrier) and e.g. include an order for registration signs with registration numbers from ABC 123 to ABC 999. From these registration signs, two of each registration number shall be ordered for each vehicle (if it is replacement signs, only one can be ordered), and except for the registration number each sign can be provided with other marks and/or symbols, e.g. a field marking for a tax receipt and other numbers and/or bar codes for each sign 2.

The diskette 33 is inserted into a computer 34 controlling a control unit 35 which in turn operates the ionographic printer 24 to continuously provide toner pictures or images on the drum 26 corresponding to registration numbers and other information in the predetermined program and to continuously transmit these images to the reflecting surface 23 of the web 6 while the web 6 travels through the ionographic printer 24.

With this method new registration numbers 3 for registration signs 2 for vehicles can be printed continously on a web 6 which travels at a speed of e.g. 25–50 m/min. and with a great adhesitivity to the reflecting surface 23 of the web.

Figure 2:
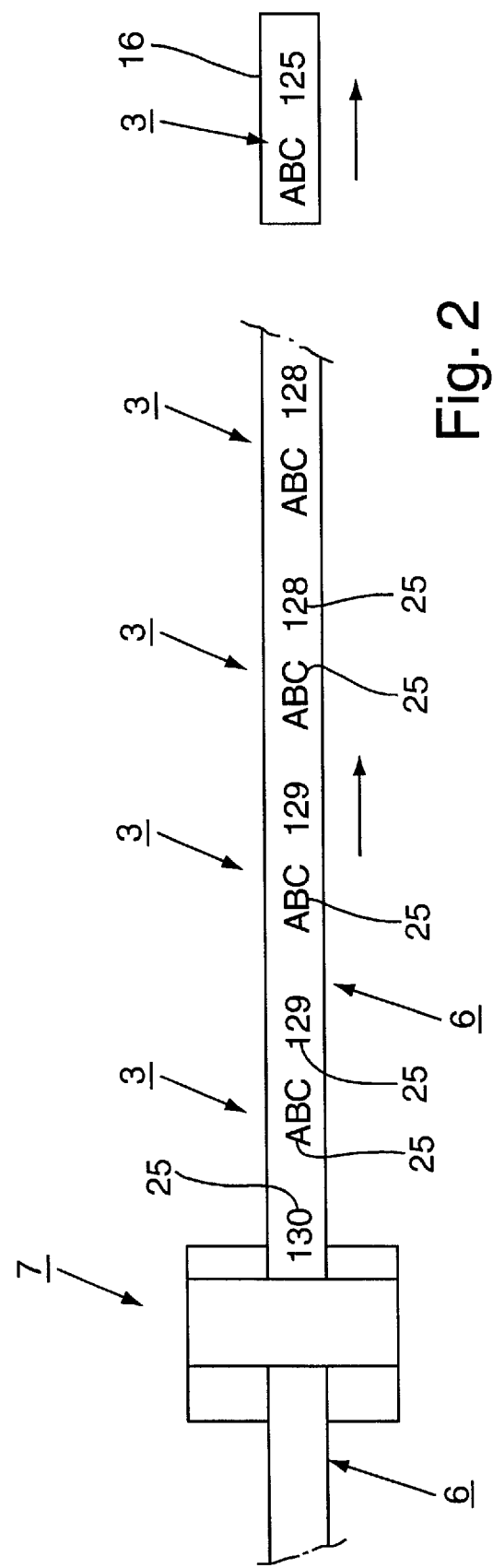
FIG. 2 with a plan view schematically illustrates members forming part of the plant of FIG. 1 as well as a web produced for manufacturing signs.

As is schematically shown in FIG. 2, the web 6 will be provided with closely behind each other located fields with registration numbers 3, whereby each registration number 3 is printed or written an optional number of times, e.g. once, twice, thrice and so on, before the next registration number 3 is printed.

The film web 6 provided with registration numbers 3 runs through the station 8 wherein the on both sides adhesive, transparent web 9 of plastic film is continuously adhered onto the top side thereof. This web 9 of plastic film includes a layer 36 of a binding agent, e.g. an adhesive layer, on the underside to enable this adherence to the web 6. The web 9 further comprises a layer 37 of a binding agent, e.g. an adhesive layer on the top or upper side for adhering the front plates 12 thereon. This is carried out continuously in station 11 and in station 14 the plastic-film webs 6 and 9 and the front plates 12 are pressed against each other to ensure that they are attached to each other.

The webs 6, 9 attached to each other and with the front plates 12 attached thereto, are cut continuously in cutting station 15 such that partially complete sign packages are continuously obtained, whereby each such partially complete sign package consists of a portion 16 a and front plate 12. These partially complete sign packages are continuously moved to the station 17 for continuous supply of bottom plates 18. These plates have a layer 39 of a binding agent, preferably an adhesive layer, on one side, whereby a bottom plate 18 can be brought to adhere to that portion 16 of the sign package 38 which is formed by the film web 6. Alternatively, the layer 39 of binding agent can be applied to the underside of the film web 6 instead, or a separate layer 39 of binding agent can be placed between the film web 6 and bottom plate 18 with special equipment. The sign packages 38 each of which consists of the front plate 12, a portion 16 (including the film 9 with adhesive on both and has a generally rectangular periphery 44. sides) and a bottom plate 18, are continuously transferred to the injection moulding device 20, in which the sign packages 38 are continuously provided with the frames 21. Each frame 21 is made of a plastic material which is injection moulded along and around the periphery 44 of the associated sign package 38 in such a way that it sealingly closes said sign package along all sides thereof. The frame 21 preferably has a substantially U-shaped cross section, whereby its web portion 40 from the outside covers the edges of the sign package 38, while one of its shanks 41 closely engages the underside of the bottom plate 18 and the other shank 42 closely engages the upper or top side of the front plate 12.

The sign portions are preferably made of plastic material of such similar type that the sign can be completely recovered.

The frame 21 preferably consists of the same or similar plastic material as the members engaged thereby —such as the bottom plate 18 and front plate 12 and eventually the edges of intermediate portions 9 and 16. Hereby, the plastic material of the frame 21 may through heating be fused or melted together with the plastic material of the bottom and front plates 18 and 12 respectively, and eventually with the plastic material of portions 9 and 16, whereby the frame 21 defines a completely sealed unit together with the members and portion 12, 18, 9 and 16 within said frame.

The registration signs 2 ordered according to the program of the customer are thereby manufactured continuously at a high speed and with exactly the registration numbers 3 ordered by the customer, whereby it is possible to produce complete registration signs at a high speed.

Each manufactured registration sign 2 is designed such that its registration number can not be damaged or made indistinct during normal use. Each registration sign 2 made also becomes so robust that it can withstand heavy shock loads and have such elasticity that it yields instead of breaks in light collisions.

Additionally, the film web 6 may consist of or contain such material and/or be designed such that damages thereon and/or on other portions of the sign can not be hidden if one tries to restore the film web 6 and/or other portions of the sign or unauthorized manipulation thereof.

The invention is not limited to the signs defined above or to the method described above for the manufacture thereof, but the sign and the method of manufacture may vary within the scope of the following claims.

As examples of alternatives to the sign and the method of manufacture defined above, it should be mentioned that the information can be provided by electronically variable application of information-defining material by other devices than said ionographic printers. Thus, other electronic printers can be used as well as ink beam writers of various types. If the signs are registration signs, they need not be manufactured with registration numbers in consecutive order but in other orders as desired by the customer. The signs however, can be of other types than registration signs for vehicles and the information can be of totally different type than features for registration. Thus, the information can be any type of text, symbol or picture information which can be provided by electronically variable application of information-defining material, e.g. toner material, by transfer thereof from a toner drum to a web. The ionographic printer used for the application of the toner material is particularly suitable for printing or writing on surfaces of reflecting material, but it can also be used for printing on other materials. The web on which the information shall be applied can be of the type used for manufacturing plastic labels, but also of other suitable materials, e.g. plastic material. Thus, the web may e.g. consist of material which simultaneously forms the cover plate and information carrier. At such an embodiment, the information, e.g. the toner material, can be applied on that side of the web which defines the underside of the cover plate and eventually, said underside can thereafter be provided with reflecting material. Hereby, signs can be produced, which consist only of a plate that protects the information applied on the underside thereof. The web may—as is shown in FIG. 1—consist of a longitudinal film band or strip, but it can alternatively consist of a row of separate film portions. The film portions can be provided by cutting a film web after applying the information.

The double adhesive plastic film web can be dispensed with and the front plates instead be provided with a layer of binding agent in order to directly attach these and the web carrying the information to each other. The frame and bottom plate can be constructed as a unit and the web with the information can be provided with watermarks or another visible or invisible security marking. If the signs comprise various layers as is shown in the drawings, these layers are preferably pasted to each other along the major portion, preferably all portions of their surfaces, which prevents penetration of moisture and particles of dirt therebetween. Hereby, it is ensured that one also can drill holes through the signs for mounting screws without penetration of moisture and dirt between the layers through such holes. The various members or parts of the sign may consist of other than said materials and the frame can be made and/or located in other ways than by injection moulding. The front plate preferably consists of such a material that it withstands exterior damage when in traffic, e.g. flying stones, moisture, intensive washing etc.. The information applied onto the portions 16 may except for registration symbols be information about state code and/or state symbol and/or national colour and/or national flag.

The registration symbols can be applied onto consecutive portions 16 in alphabetical and numerical order for a certain customer and in a non-alphabetical and non-numerical order for another customer.

The plant illustrated in the drawings may vary e.g. with regard to type and number of stations in view of the type of signs to be produced and the number of layers in each sign.

I claim:

1. The method for manufacturing signs comprising:

successively feeding film portions (16) having top and bottom faces and of given size and shape through a printer (7) to print informational characters (25) onto the top face of each of said film portions, placing transparent a front plate (12) of a size and shape similar to the size and shape of said film portions (16) respectively over the printed top face of each of said film portions and in registration with said film portions so that the edges of each film portion and the edges of its associated front plate define a common periphery, and injection molding a frame (21) around each of said common peripheries such that said frames prevent penetration of moisture and dirt between each of said film portions (16) and its associated front plate (12).

2. The method according to claim 1, further including the steps of:

applying a bottom plate (18) to each of said film portions (16), and sealing the top face of each film portion (16) to its associated front plate (12) and the bottom face of each film portion (16) to its associated bottom plate (18) to prevent penetration of foreign materials between each film portion and its associated front plate and between each film portion and its associated bottom plate.

3. The method according to claim 2, wherein each film portion (16) is adhesively secured to its associated bottom plate (18) over at least the major portion of its bottom face, and each film portion (16) is adhesively secured to its associated front plate (12) over at least the major portion of its top face by means of a transparent film carrying top and bottom layers of adhesive.

4. A method for manufacturing registration signs for vehicles, said method comprising the steps of feeding a film (6) through an electronic printer to provide sign portions (16) of said film with registration characters (3) through the electronically variable application of toner material (25), said printer being an ionographiic printer (24) whereby said toner material (25) is applied to a surface (23) of said film (6) by a cold pressure and fixing method, controlling said ionographic printer (24) to apply said registration characters onto said film (6) in accordance with a program of information in the form of registration characters including predetermined ordered registration characters (3), placing each sign portion (16) of said film (6) carrying registration characters under a transparent front plate (12) of such material as to be capable of withstanding exterior damages occurring during use in traffic, thereafter cutting said film to separate said sign portions (16) from one another and injection moulding a frame (21) around the edges of each of said sign portions (16) and its associated front plate (12) such that said frame prevents penetration of moisture and dirt into the region between said sign portion (16) and its associated front plate (12).

5. The method according to claim 4 wherein each portion (16) carrying registration characters is placed between a bottom plate (18) and a transparent front plate (12), and sealingly attaching said bottom plate (18), said portion (16) and said front plate (12) to one another with an airtight seal to prevent penetration of moisture and dirt therebetween.

6. The method according to claim 5 further including the steps of adhesively securing said bottom plate (18) and said portion (16) to each other along at least the major part of their opposed surfaces, and adhesively securing said front plate (12) and said portion (16) to each other using a transparent plastic film (9) having an adhesive layer on both of its sides.

7. The method according to claim 5 wherein said bottom plate (18), said front plate (12) and said portion (16) form a sign package (38), and providing a frame (21) for said sign package (38) which frame is brought into surrounding relationship with said sign package in such a way as to prevent penetration of moisture and dirt into said sign package.

8. The method according to claim 4 wherein said film is provided as a film web (6) continuously fed through said ionographic printer (24), and including the steps of continuously providing said film web (6) with a plastic web (9) having an adhesive layer (36) on one of its faces and another adhesive layer (37) on the other of its faces, said plastic web (9) being fixed to said film web (6) by said layer (36), continuously supplying front plates (12) to said webs (6 and 9) and fixing them to said webs by means of said layer (37), cutting said webs (6 and 9) with front plates (12) to define portions (16) carrying said registration characters (3), continuously supplying said bottom plates (18) to said portions (16) and fixing them thereto to provide sign packages (38), and then continuously injection moulding frames (21) to said sign packages.

9. The method according to claim 4 wherein a counter-pressure roll (27) is used as a holder for said film (6) when said toner material (25) is fixed to said surface (23) thereof so that transfer and fixation of said toner material to said surface (23) occur in the same process.

10. The method according to claim 4 wherein said registration characters (3) are applied to said film (6) such that unauthorized damage thereto cannot be hidden by attempts to restore said film to its original condition.

11. The method according to claim 4 wherein said ionographic printer (24) is controlled to apply registration characters (3) onto said film (6) in accordance with a predetermined program and in a predetermined numerical order.

12. A method for manufacturing through an electronic printer to provided, sign portions (16)of said film with registration characters (3) through the electronically variable application of toner material (25), said printer being an ionographic printer (24) whereby said toner material(25) is applied to a surface (23) of said film (6) by a cold pressure and fixing method, controlling said ionographic printer (24) to apply said registration characters onto said film (6) in accordance with a program of information in the form of registration characters including predetermined ordered registration characters (3), placing each sign portion (16) said film (6) carrying registration characters under a transparent front plate (12) of such material as to be capable of withstanding exterior damages occurring during use in traffic, and injection moulding a frame (21) around the edges of said sign portion (16) and of its associated front plate (12) such that said frame prevents, penetration of moisture and dirt into the region between said sign portion (16) and its associated front plate (12), said film being provided as a film web (6), said registration characters (3) being continuously applied to said web (6) while said web is continuously fed through said ionographic printer (24), said step of placing each sign portion of said film under a transparent front plate being carried out by after the application of said registration characters (3) to said web continuously cutting said web into portions (16) carrying registration characters and then continuously combining said cut portions (16) with said front plates (12) of transparent material to form sign packages (38) around the edges of which said frames are injection moulded.

13. The method according to claim 12 further including the step of combining bottom plates (18) with said portions (16) so that each of said sign packages is made up of a portion (16) carrying registration characters (3), a front plate (12) and a bottom plate (18).

14. A method for manufacturing signs comprising the steps of:

continuously feeding a film web (6) having top and bottom faces through a printer to print informational characters (25) onto the top face of portions (16) of said film web, continuously feeding a transparent carrying web (9) having top and bottom faces, and carrying top and bottom layers (37 and 36) of adhesive respectively on said top and bottom faces of said carrying web, into association with said film web (6) so that said bottom layer (36) of adhesive carried by said carrying web (9) adhesively and sealingly contacts said top face of said film web (6) to adhesively secure said carrying web (9) in overlying relationship to said film web (6), providing a plurality of individual transparent front plates (12) and applying them in succession to said top layer (37) of adhesive carried by said carrying web (9) so that said front plates respectively cover successive ones of said printed portions (16) of said film web (6), and thereafter cutting said film web (6) and said carrying web (9) between successive ones of said front plates (12) to form individual units each including a printed portion (16) of said film web (6), an associated portion of said carrying web (9), and one of said front plates (12).

15. The method as defined in claim 14, further including the steps of:

providing a plurality of individual bottom plates, and continuously applying said bottom plates successively to respective ones of said units so that each of said bottom plates is adhesively secured to the bottom face of the film web portion of the associated unit.

16. The method as defined in claim 15, wherein:

in each of said sign packages the film web portion (16), the carrying web portion, the front plate (12) and the bottom plate (18) included in the sign package are of the same size and shape and are registered with one another so that their edges form a common periphery for the sign package, and said front and rear plates are both made of a plastic material, and further comprising the step of injection molding a plastic material around said common periphery of each of said sign packages to form a frame for said sign package and such that for each sign package said plastic material of said frame becomes heat sealed to said plastic materials of said front plate and said bottom plate to prevent the ingress of contaminating foreign materials into said sign package through said common periphery.

17. The method for manufacturing signs comprising:

feeding a film web (6) having top and bottom faces through a printer (7) to print informational characters (25) onto the top face of successive portions (16) of said film web, feeding a transparent adhesive layer carrying web (9) having top and bottom faces carrying respectively a top layer (37) and a bottom layer (36) of adhesive into contact with said top face of said film web (6) so that said bottom layer of adhesive adhesively engages and seals said carrying web to said top face of said film web, providing a plurality of individual front plates (12) of transparent material and continuously fixing said front plates to successive ones of said film portions (16) by means of said top layer (37) of adhesive, cutting said film web (6) between successive ones of said front plates to form separate units each including of one portion (16) of said film web (6), a front plate (12) and an associated portion of said carrying web (9), providing a plurality of bottom plates (18) and attaching them individually to the bottom faces of the film web portions (16) of each of said units to form sign packages (38) each having a common periphery defined by the edges of the film web portion (16), the carrying web (6) portion, the associated front plate (12) and the associated bottom plate (18) included in the sign package, and then injection molding a frame of plastic material around said common periphery of each of said sign packages to prevent the ingress of contaminating materials from the surrounding environment into said sign package through said common periphery.

* * * * *